Dec. 20, 1960    S. B. GUNST ET AL    2,965,781
NEUTRON-COUNTER
Filed Jan. 23, 1957

WITNESSES:
NW L Groome
Donald J Smith

INVENTORS
Samuel B. Gunst and
Robert T. Bayard.
BY
Arthur T. Stratton
ATTORNEY

United States Patent Office 2,965,781
Patented Dec. 20, 1960

2,965,781

NEUTRON-COUNTER

Samuel B. Gunst, Baldwin, and Robert T. Bayard, Whitehall, Pa., assignors, by mesne assignments, to the United States of America as represented by the United States Atomic Energy Commission Filed Jan. 23, 1957, Ser. No. 635,694

4 Claims. (Cl. 313—61)

The present invention relates to thermal neutron counters and, more particularly, to such counters of high sensitivity adaptable for use under conditions of high pressures and temperatures.

The neutron has been found to be a subatomic particle having no charge and having about the same mass as a proton. The absence of an electric charge prevents the neutron from being directly detectable by Geiger tubes, cloud chambers, or ionization chambers. It is customary, then, to induce the neutrons to engage in an intermediate nuclear reaction which yields charged particles for detection in a suitable ionization chamber or the like. When detecting and measuring neutronic radiation, neutrons have been categorized, as to their kinetic energies, into thermal and fast neutrons. Thermal or slow neutrons denote those neutrons having energy levels on the order of that required to fission most efficiently the atoms of fissionable isotopes, such as $U^{235}$, $U^{233}$, or $PU^{239}$.

Inasmuch as thermal neutrons effect the fissioning process upon direct contact with an atom of thermally fissionable material, measurement or counting thereof is accomplished frequently through the use of a neutronic fission counter, of which the present invention is an improvement. The fission counter includes usually a pair of opposed electrodes, coated with one of the thermally fissionable materials mentioned previously, and enclosing between them a space filled with a suitable ionizable gas. When thermal neutrons impinge upon the coatings a number of atomic fissions are induced, each of which radiates a number of charged particles. An equivalent number of conductive paths are formed between the electrodes by the ionizational effects of the emitted particles upon the gas confined by the electrodes. The resulting pulses or counts, which are recorded in appropriate electrical metering circuitry coupled to the electrodes, are proportional to the flux density of the thermal neutrons. The specificity of the fission counter to thermal neutrons permits this counter to be used in determining the operating characteristics of chain reactions by measuring their associated thermal neutron densities, and particularly, to measure the source level thereof.

When the source level of the thermal neutron flux is of the same order of magnitude as that produced by cosmic-rays, it is impossible to measure the source level with conventional neutronic counters. Furthermore, neutronic counters in their present form cannot be subjected to the extremely high pressures and temperatures, which in many applications may be in the neighborhood of 2000 p.s.i. and 600° F., respectively. Increasing the neutronic sensitivity of a conventional type counter has not avoided the problem because variations in the cosmic-ray and gamma background can mask the changes in the neutronic source level which is to be measured. Therefore, to measure the source level efficiently, the counter must be so constructed that it is comparatively insensitive to the background radiation in the vicinity of the counter. Prior counters, then, suffered from the further disadvantages, that they were unduly sensitive to gamma and other background radiation and that the maximum tolerable neutronic flux densities in which the counters could be operated efficiently were too low for present day applications.

Conventional counters of the character described have been designed heretofore to operate, for the most part, at a maximum temperature of 80° C. Consequently, the utilization of any such counter under conditions wherein the ambient temperature substantially exceeds 80° C. dictates the use of a separate cooling system for the counter. The cooling system not only increases the cost of the counter and is difficult to operate, but additionally reduces the sensitivity of the neutronic counter so utilized.

Accordingly, an object of the invention is to provide an efficient and inexpensive neutronic fission counter.

Another object of the invention is to adapt a neutronic fission counter for operation at extremely high temperatures and pressures.

Another object of the invention is to stabilize the detecting characteristics of the counter during cycling thereof between room temperature and high operating temperatures thereof, for example, with the latter-mentioned temperatures being between 500 to 600° F.

Further objects of the invention are to render a neutronic counter less sensitive to background radiation and to increase the neutronic sensitivity thereof.

Still another object of the invention is to reduce the deleterious effect of gamma radiation upon the neutronic sensitivity of the aforementioned counter.

Still further objects of the invention are to minimize neutronic and gamma absorption in the component parts of a neutronic counter, to lessen, thereby, the induced radioactivity of the counter, and to minimize the accumulation of heat developed in the counter.

Yet another object of the invention is to increase the maximum tolerable gamma intensity of a neutronic counter.

Still another object of the invention is to increase the maximum neutronic fluxile density at which the neutronic counter can be utilized without deterioration thereof.

These and other objects, features and advantages of the invention will be made apparent during the ensuing description of illustrative forms thereof, which description is to be taken in conjunction with the accompanying drawings, wherein.

In accordance with the invention, a neutronic fission counter of the character described is provided with means for the sealing thereof and for electrically connecting the counter to external metering circuitry which means are adapted to withstand extremes in temperatures and pressures. The electrodes of the counter are shaped in a manner to reduce noise due to alpha particles and cosmic, or other background noise. The electrodes are further shaped or arranged to minimize neutronic and gamma absorption of the counter and to increase the area of fissionable coating which can be applied to the counter for a given size thereof. The surfaces of the electrodes of the neutronic counter to which the fissionable coatings are applied are arranged such that the coatings are supported with a relatively large communal area of opposition between the coatings while at the same time minimizing the range of possible track lengths of the particles emitted by the fissionable coatings. The reduced range of track length afforded by this arrangement produces a more uniform pulse-height distribution as a result of the fissions produced in the coating and thereby yields an increase in neutronic sensitivity.

Figure 2:
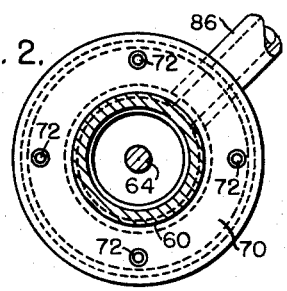
Fig. 2 is a top plan view of the counter shown in Fig. 1.
Figure 1:
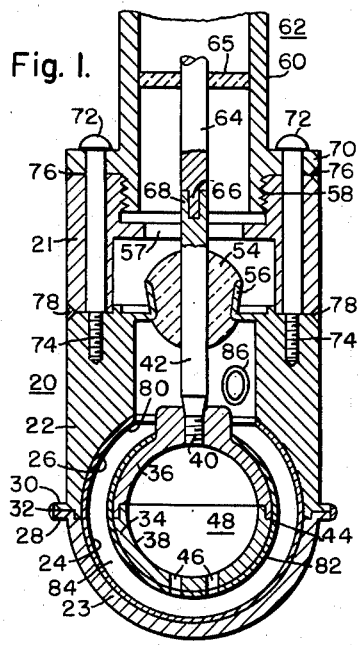
Figure 1 is a longitudinal sectional view of one form of neutronic fission counter constructed in accordance with the principles of this invention.

Referring now more particularly to Figs. 1 and 2 of the drawings, the exemplary form of the invention illustrated therein comprises a housing indicated generally by the reference character 20 and including a coaxial cable adapter 21 and a casing member 22 terminating in a hollow hemispherical cap 23. The active electrodal surface 24 of the casing member 22 of the neutronic counter is formed by the inner surface of the hemispherical cap 23 and a complementary, spheroidal surface 26 imparted to a portion of the internal surface of the casing member 22. The hemispherical cap 23 is provided with flange 28 which is adapted to be secured and sealed to a complementary flange 30 of the casing member 22, as by an annular sealing weld 32. Thus, the hemispherical cap 23 is removable for the insertion of a hollow spherical electrode 34, which forms the inner electrode of the neutronic counter. The electrode 34 is desirably fabricated from a material of low neutronic absorption cross section, such as aluminum.

The inner electrode 34 is preferably constructed from upper and lower hollow hemispherical sections 36 and 38, respectively, to facilitate manufacture of the inner electrode. The upper hemispherical section 36 is provided with a tapped hole 40 into which the lower, threaded end of an electrode shaft 42 is threaded to position the inner electrode 34 centrally of the outer electrodal surface 24. The lower hemispherical section 38 is rigidly secured to the upper hemispherical section 36 by an annular weld 44, and is provided with a pair of holes 46. Before securing the hemispherical cap 23 to the casing member 22 a suitable tool (not shown) is inserted into the holes 46 to facilitate tightening the inner electrode 34 upon the electrode shaft 42. The hollow space 48 enclosed within the electrode 34 and the material thereof minimizes neutronic and gamma absorption within the electrode 34 and therefore reduces the radioactivity and heat induced within the neutronic counter.

The electrode shaft 42 is hermetically sealed to the housing 20 through the use of a glass bead 54 fixed to the shaft 42 and to an annular upturned sealing flange 56, which, in this example, is formed integrally with the casing member 22. To facilitate sealing in this manner the outer electrode 22 and the shaft 42 are fabricated from a material adapted to form an efficient glass to metal seal, such as Kovar. Thus, the inner and outer electrodes are hermetically sealed within the neutronic counter casing member 22 by means of the fused glass bead 54 and the annular sealing weld 32, noted heretofore. The aforementioned sealing means, because of the materials selected to form the same, is adapted to withstand the extremely high temperatures encountered in present day applications of the counter. It will be appreciated that the casing member 22 and the coaxial cable adapter 21 are provided of such thickness, which together with the spheroidal geometry of the cap 23 and the exterior sealing means presently to be described, enables the housing 20 of the fission counter to withstand the extremely severe pressures frequently encountered when using the counter. As stated heretofore, such pressures may be as high as 2000 p.s.i. and higher.

The coaxial cable adapter 21 is provided with an opening therethrough, as indicated generally by the reference character 57, and is tapped interiorly adjacent the upward end 58 thereof for threadedly securing an outer sleeve 60 of a coaxial cable 62 to the adapter 21. The coaxial cable 62 is provided desirably in such length to extend outwardly through the wall of a suitable pressure and/or temperature barrier (not shown) and is adapted to be coupled in any convenient manner to external electrical metering circuitry. The inner lead of the coaxial cable 62 is formed from a rod 64 suitably spaced from the outer sleeve 60 by means of a number of ceramic spacers 65 and terminates at the lower end thereof in a stud 66. The rod 64 and the outer sleeve 60 are formed from suitable electrically conductive materials, and, if the counter is intended for use in pressurized, highly corrosive atmospheres, the outer sleeve can be formed from stainless steel or Kovar. The stud 66 is adapted to be inserted into a spring clamp 68 provided in the upward end of the electrode shaft 42. Thus, a secure electrical joint is formed between the electrode shaft 42 and the rod 64 as the outer sleeve 60 of the coaxial cable 62 is threaded into the tapped portion 58 of the coaxial cable adapter 21.

The outer sleeve 60 of the coaxial cable is furnished with a flange 70 which is secured to the electrode member 22 by means of bolts 72 inserted through suitable apertures in the flange 70 and the coaxial cable adapter 21 and threaded into tapped holes 74 of the casing member 22. In this arrangement, the counter of Fig. 1 is inserted into a high pressure reentrant thimble sealed into the wall of the high pressure and temperature barrier. Alternatively, the imposition of extremely high pressures to the fused glass bead 54 and the parts associated therewith can be prevented by hermetically sealing the outer sleeve 60 of the coaxial cable 62 and the coaxial cable adapter 21 to the electrode member 22 by annular sealing welds 76 and 78 respectively. In this latter embodiment the bolts 72 and associated apertures are not utilized.

For the purpose of converting the number of thermal neutrons passing through the walls of the electrodes 24 and 34 into equivalent electrical impulses, as described heretofore, individual coatings 80 and 82 are provided, respectively, upon the outer and inner electrodes 24 and 34. The coatings 80 and 82 comprise at least a portion of fissionable material, for an example uranium oxide ($U_3O_8$), in which the uranium is enriched to a total in excess of 90 percent of the $U^{235}$ isotope. An ionizable gas is entrapped in the space 84 enclosed between the outer and inner electrodes 24 and 34. Upon contacting the coatings 80 and 82, the impinging thermal neutrons cause a proportionate number of atomic fissions in the $U^{235}$ atoms of the coating. Each atomic fission is converted into an electrical pulse by means of ionized, conductive paths which are created in the ionizable gas confined between the outer and inner electrodes, as is well known, by the fissional fragments and radiations emitted by the fissioning $U^{235}$ atoms. The ionizable gas, in this example of the invention, includes 10% carbon dioxide in a balance of argon at atmospheric pressure and filling the space 84 between the outer and inner electrodes 24 and 34, respectively. The space 84 is evacuated and refilled by means of gas filling tube 86 communicating with the interior of the casing member 22 and with the space 84.

The spheroidal geometry of the inner and outer electrodes 34 and 24 limits the number of possible track lengths accessible to the ionizing particles traversing the space between the spherical electrodes. The limitation imposed upon the possible track lengths, as compared for an example to that between concentric cylinders of conventional counters is believed to be responsible for the flatter pulse height distribution evinced by external metering circuitry when coupled to the fission counter disclosed herein. It is apparent that the flattened pulse height distribution is responsible for the neutronic sensitivity of the disclosed counter remaining substantially constant although the X-ray or gamma density of the area wherein the counter is being utilized is increased greatly. Compared with conventional fission counters the change in neutronic sensitivity accompanying fluctuations in X-ray or gamma intensity has been found to be relatively small. Likewise, and apparently for the same reason, the maximum tolerable X-ray or gamma intensity of the spherical fission counter has been found to be substantially greater than the maximum tolerable intensities of conventional fission counters.

In those applications in which the requirements of neutron sensitivity are not stringent only one of the fissionable coatings 80 or 82 need be utilized. The aforesaid pulse height distribution can then be flattened still further by providing the coating on the inner electrode only. The largest possible track length obviously is then halved in the case of a particle emitted tangentially from the inner electrode, as compared with that emitted from the outer electrode along a line of travel substantially tangent to the inner electrode.

Figure 3:
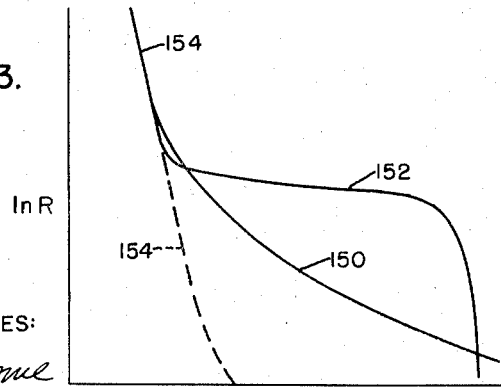
Fig. 3 illustrates graphically typical pulse height distributions in conventional fission-counters and in the counter disclosed herein.

The validity of the foregoing considerations is shown graphically in Fig. 3 of the drawings, wherein the natural logarithm of the counting rate, ln R, is plotted against a discriminator bias voltage V. When a fission counter is connected to conventional pulse amplifying and measuring circuitry including a preamplifier, amplifier, discriminator, and scaler, it is possible to obtain a pulse-height distributional curve 150 or 152 for the counting rate R as a function of discriminator bias setting V. In the absence of incident radiation, a background curve 154, caused primarily by alpha activity of the fissionable material within the counter, is observed. When the fission-counter is placed in a neutronic flux, the pulse-height distribution includes that of the neutronic flux plus background radiation as indicated by the curves 150 and 152. It has been found that the pulse-height distributional curve 150 is typical for a conventional fission-counter having coaxial cylindrical electrodes and all opposing surfaces of electrodes coated with a thermally fissionable isotope. The use of concentric spheroidal members for the electrodes substantially improves the pulse-height distribution of the fission-counter disclosed herein as indicated by the curve 152. The comparatively flat response of the spheroidal electrode counter shows that the counter is relatively insensitive to variations in amplifying gain and that the neutronic sensitivity of the counter will change very little with variation in background radiational intensity. Therefore, the disclosed fission-counter can be operated in areas of intense gamma background radiation with substantially the same neutronic counting rate as that obtained in the absence of such gamma radiation.

Figure 4:
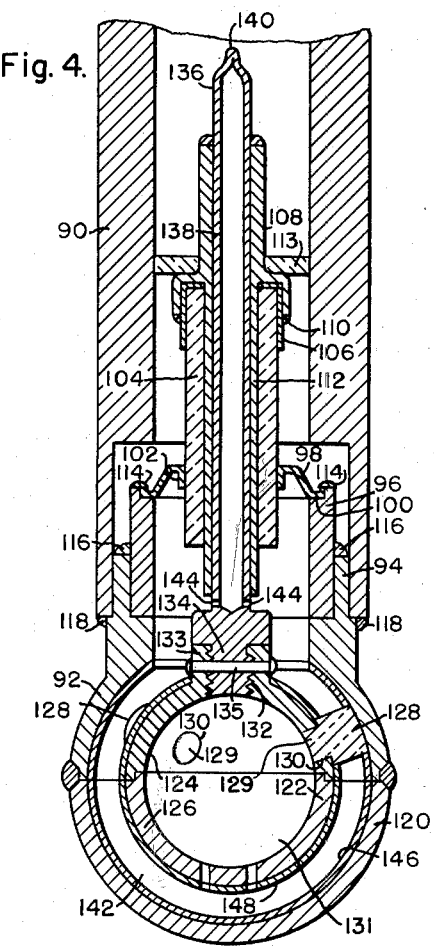
Fig. 4 is a longitudinal sectional view of another form of neutronic fission counter constructed according to the invention.

Referring now to Fig. 4 of the drawings, the illustrative form of the invention shown therein comprises an outer coaxial casing 90 hermetically sealed at the lower end thereof to bipartite spheroidal outer electrode 92. The electrode 92, fabricated from aluminum or other material of low capture cross section, is formed with an annular extension 94, to which a stainless steel cylinder 96 is secured. At the top of the cylinder 96 a reentrant sealing flange 98 is mounted within the recessed portion 100 provided at the upper end of the cylinder 96. The sealing flange 98 is furnished with a reentrantly disposed annulus 102 adapted to be sealed to a ceramic sleeve 104. In one exemplary arrangement of the invention, the sleeve 104 may be formed from fused alumina ($Al_2O_3$) and the reentrant flange 98 from iron, which can be sealed hermetically to alumina, in a well-known manner. Adjacent the upward extremity of the ceramic sleeve 104, an iron cap 106 is likewise hermetically sealed thereto, to which cap a casing member 108 is secured and sealed, as by the annular sealing weld 110. The casing member 108 is maintained in a suitably spaced position relative to the outer casing 90 by the ceramic spacer 113, if desired, and is provided with a downwardly extending tubular projection 112, upon which the ceramic sleeve 104 is mounted. In many applications the spacer 113 can be omitted and the casing member 108 will be adequately supported by the aforementioned seal and by a central coaxial conductor (not shown) which is frictionally engageable with the upward end of a gas filling tube 136, presently to be discussed in further detail. The tubular projection 112 is thus arranged to stabilize the ceramic sleeve 104 and to prevent thereby the impartation of strains to the hermetic seal formed between the sleeve 104 and the sealing flange 98. The reentrant sealing flange 98, the cylinder 96, and the casing 90 are hermetically sealed, in this example, to the outer spheroidal electrode 92 by means of the annular sealing welds 114, 116 and 118, respectively.

The outer electrode 92 is desirably provided with a separable bottom portion 120 in order to permit convenient insertion of an inner spheroidal electrode 122. The latter is furnished in the bipartite form of upper and lower complementary, spheroidal sections 124 and 126 to facilitate manufacture of the inner electrode 122, as described heretofore in connection with the inner electrode 34 of Figs. 1 and 2. The inner electrode 122 is stabilized and supported concentrically of the outer electrode 92 by means of ceramic spacer members 128 secured to the inner electrode 122 and bearing against the inner surface of the outer electrode 92. In this example of the invention, three such spaced apart spacer members 128 are utilized with only one being shown in section. Each of the spacers 128 has an inwardly projecting stud 129 inserted into one of the apertures 130 provided in inner electrode 122. The inner electrode 122 is provided with a central cavity 131 for the purposes noted heretofore in connection with the hollow space 48 of the inner electrode 34 shown in Figs. 1 and 2. In an annular projection 133 of the inner electrode 122, there is formed a tapped hole 132 for threading the electrode 122 upon a threaded stud portion 134 secured to the lower end of the gas filling tube 136. The prevention of relative movement between the inner electrode 122 and the stud 134 threaded therein is ensured by the insertion of a pin 135 through suitable apertures in the stud 134 and the annular projection 133 of the inner electrode 122.

The gas-filling tube 136 is inserted through a channel 138 formed centrally of the casing member 108 and is adapted to be pinched off and welded at the upper end 140 thereof, in a well known manner, after evacuating and filling the space 142 enclosed between the outer and inner electrodes 92 and 122. A number of apertures 144 are provided adjacent the lower end of the gas-filling tube 136 for the purpose of communication from the interior of the tube 136 into the space 142. The gas filling tube 136 serves, in this example, as an electrical connector for the inner electrode 122 and is electrically insulated from the sealing flange 98, the cylinder 96, and the outer electrodes 92 by the interposition of the ceramic sleeve 104.

For the purposes described heretofore in connection with Figs. 1 and 2 of the drawings, suitable coatings 146 and 148, having a fissionable isotope forming at least a portion thereof, are provided on opposed surfaces of the outer and inner electrodes 92 and 122, respectively.

The casing 90 is desirably hermetically sealed to the wall of a pressurized vessel such that the electrodes 92 and 122 extend inwardly of the vessel, and the casing 90 and the upward end of the gas filling tube 136 can be coupled respectively, in any convenient manner, to the outer sleeve and inner electrode of a coaxial cable adapted to connect the electrodes 92 and 122 to external electrical metering circuitry. To facilitate the aforesaid coupling, the gas filling tube 136 is supported centrally of the outer casing 90 by means of the casing member 108.

From the foregoing, it will be apparent that novel and efficient forms of a neutronic fission counter have been disclosed. Due to the manner of forming and sealing the counter, and the resulting electrodal geometry, the neutronic sensitivity of the counter is increased and at the same time the counter is adapted for use at extremely high temperatures and pressures.

Inasmuch as the foregoing illustrations of the invention are exemplary in nature, numerous modifications thereof will occur to those skilled in the art without departing from the scope of the appended claims. Furthermore, it is to be understood that certain features of the invention can be utilized without a corresponding use of other features.

We claim as our invention:

1. A heat and pressure resistant radiation counter adaptable to the counting of thermal neutrons comprising a metallic housing having a spheroidal electrodal surface disposed therein and a channel communicating with the interior of said surface and extending through said housing; a metallic sealing flange joined to the walls of said channel; a heat-resistant ceramic sealing member sealed to said flange; an electrical conductor inserted through and sealed to said ceramic member, said conductor terminating in a threaded portion; a spheroidal inner metallic, hollow, gas filled electrode suspended within said electrodal surface, said inner electrode threadedly engaging said conductor and being supported thereby; a fissionable coating disposed on at least one of said electrode and said surface; a coaxial cable including an outer metallic sheath and a central electrode; and means for hermetically joining said cable to said housing and to said conductor whereby the ceramic sealing member is protected from external pressure.

2. A heat and pressure resistant radiation counter adaptable to the counting of thermal neutrons comprising an elongated metallic housing having an inwardly disposed electrodal surface formed adjacent an end of said housing; a metallic sealing flange secured to said housing at a position adjacent said surface; a heat resistant ceramic sealing member supported by said flange and sealed thereto; a conductive shaft inserted through said sealing member and sealed thereto, said shaft having a threaded stud at an end thereof; an inner metallic, hollow, gas filled electrode threadedly secured to said stud and supported thereby centrally of said electrodal surface, and a fissionable coating disposed on at least one of said electrode and said surface.

3. A heat and pressure resistant radiation counter adaptable to the counting of thermal neutrons comprising an elongated metallic housing having an inwardly disposed spheroidal electrodal surface formed adjacent an end of said housing, a metallic sealing flange secured to said housing at a position adjacent said surface, a heat resistant ceramic sealing member supported by said flange and sealed thereto, a conductive shaft inserted through an opening in said sealing member, said shaft being supported by said member and being sealed thereto, an inner hollow, metallic, gas filled spheroidal electrode, means for securing said electrode to the adjacent end of said shaft, said electrode being supported by said shaft interiorly of said surface, and a fissionable coating disposed on at least one of said electrode and said surface.

4. A heat and pressure resistant radiation counter adaptable to the counting of thermal neutrons comprising an elongated metallic housing having an inwardly disposed spheroidal electrodal surface formed adjacent an end of said housing, said housing having a channel extending therethrough from said surface to the other end of said housing, a metallic sealing flange disposed within said channel and secured to said housing at a position adjacent said surface, a heat resistant ceramic sealing member supported by said flange and sealed thereto, a conductive shaft inserted through an opening in said sealing member, said shaft being supported by said member and being sealed thereto, an inner hollow, metallic, gas filled spheroidal electrode, means for securing said electrode to the adjacent end of said shaft, said electrode being supported by said shaft interiorly of said surface, said shaft in addition having a flow passage extending substantially therethrough, said opening communicating at one end thereof with the volume enclosed by said surface and said electrode, and sealed by said ceramic member, means for sealing the outward end of said shaft to close the other end of said opening, and a fissionable coating disposed on at least one of said electrode and said surface.

References Cited in the file of this patent

UNITED STATES PATENTS

| | | |
|---|---|---|
| 2,491,220 | Segre et al. | Dec. 13, 1949 |
| 2,506,944 | Stauffer et al. | May 9, 1950 |
| 2,874,306 | Kohnman et al. | Feb. 17, 1959 |

OTHER REFERENCES

Rossi et al.: Ionization Chambers and Counters, published by McGraw-Hill Book Co., New York, 1949, pp. 178–180 relied on.